United States Patent [19]

Hoong

[11] Patent Number: 5,293,249
[45] Date of Patent: Mar. 8, 1994

[54] VIDEO CASSETTE RECORDER HAVING A PROGRAM RESERVING FUNCTION INVOLVING A USER-COLORABLE OPAQUE MARK

[75] Inventor: Kwon-pyo Hoong, Euiwang, Rep. of Korea

[73] Assignee: Samsung Electronics Co., Ltd., Kyunggi, Rep. of Korea

[21] Appl. No.: 850,925

[22] Filed: Mar. 13, 1992

[30] Foreign Application Priority Data

Apr. 1, 1991 [KR] Rep. of Korea .................. 91-5235

[51] Int. Cl.⁵ .................. G11B 15/07; G11B 23/087
[52] U.S. Cl. .................. 358/335; 360/33.1; 360/69; 360/79
[58] Field of Search .................. 360/27, 33.1, 69, 79; 358/335; 455/185.1, 186.1, 186.2

[56] References Cited

U.S. PATENT DOCUMENTS

| | | | |
|---|---|---|---|
| 4,475,153 | 10/1984 | Kihara et al. | 360/69 |
| 4,807,208 | 2/1989 | Geiger | 360/39 |
| 4,841,386 | 6/1989 | Schiering | 360/69 |

Primary Examiner—Edward K. Look
Assistant Examiner—Michael S. Lee
Attorney, Agent, or Firm—Sughrue, Mion, Zinn, Macpeak & Seas

[57] ABSTRACT

A video cassette recorder having a program reserving function for easily reserving a program by coloring in a desired time and date using a black marker and a program board is disclosed. For the programming method, a program board including sections for date (day) and time of da is provided on a VCR, so that anyone can easily execute a program recording function by merely coloring in the appointed starting time, ending time and date of a program with the marker.

6 Claims, 3 Drawing Sheets

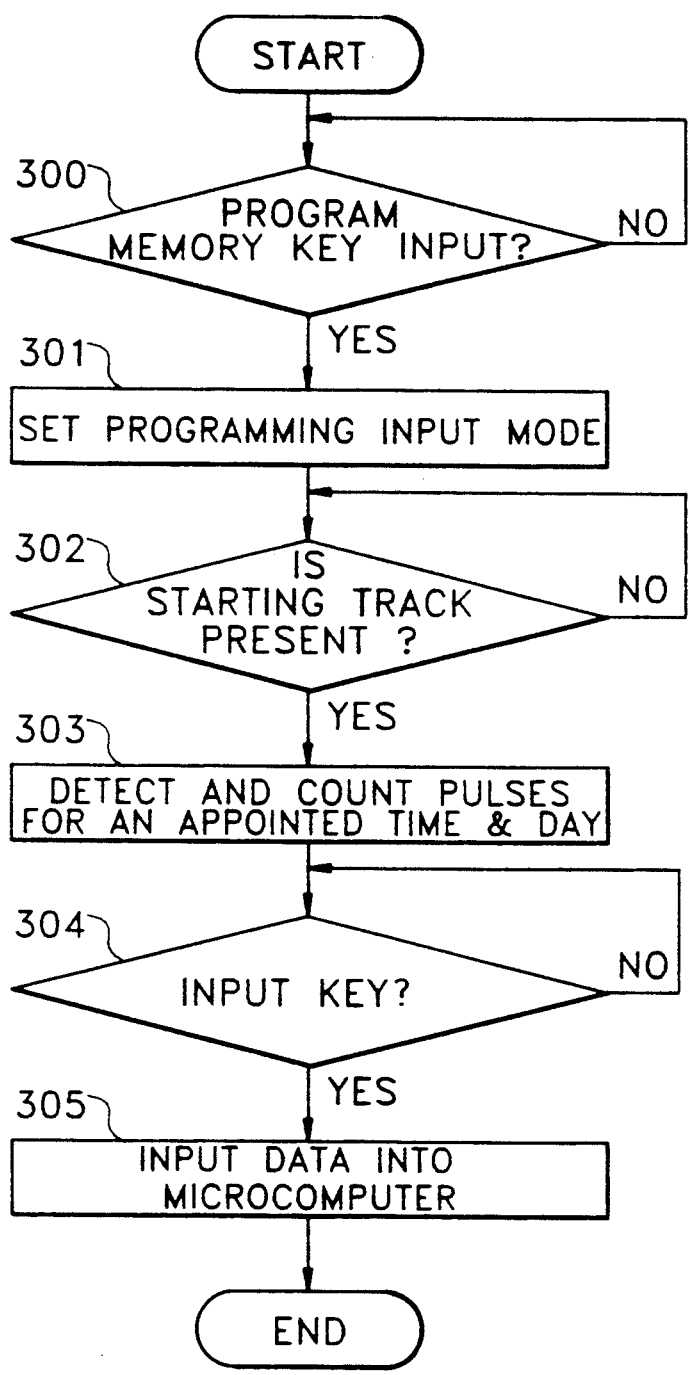

VIDEO CASSETTE RECORDER HAVING A PROGRAM RESERVING FUNCTION INVOLVING A USER-COLORABLE OPAQUE MARK

BACKGROUND OF THE INVENTION

The present invention relates to a video cassette recorder (hereinafter referred to as a "VCR") having a program reserving function, and particularly to a VCR having a program reserving function, wherein a program board formed with tracks capable of reserving an appointed time and date of a program is installed on the front plate of a VCR.

Having a programmed recording function using a timer, a conventional VCR reserves a program by receiving input data, such as the date, time and channel of the desired program according to a user's instructions, and carried out in spite of his absence.

However, a first-time user of such a VCR must refer to the manual when the above reserved programming is desired, because the conventional method is difficult in operation and requires the entry of many function keys. Thus, it may take an extremely long time for the user to reserve the recording of a program. Various current appliances are produced having so-called "easy operation" and many functions, thus it is desirable for VCR programmed recording functions to fulfill the above aim of easy operation.

In order to eliminate the above-mentioned disadvantage, a method is disclosed in U.S. Pat. No. 4,325,081 wherein programmed data to be input next to current input data is noticed, thereby receiving the programmed data according to a given order, and a programmed recording method using a menu-type on-screen display is disclosed in U.S. Pat. No. 4,908,713. However, the methods according to these patents are in actuality difficult in operation and often result in incorrect operation.

Also, a programmed recording method is described in U.S. Pat. No. 4,641,205 to give a specific code to a broadcast program using a remote-control code and receive only this specific code. However, this method is inconvenient in that a remote-controller which is used only for programmed recording is required.

SUMMARY OF THE INVENTION

Accordingly, it is an object of the present invention to provide a video cassette recorder having a program reserving function in which a program board formed with a track displaying a section corresponding to an appointed time and date is installed on its front plate, so that a user can easily reserve the appointed time and date of a program by means of an opaque mark.

To achieve the object, a VCR of the present invention capable of reserving a program, as compared to a conventional VCR comprising a tuner for tuning a broadcasting channel according to the tuning voltage of a phase-locked loop driven by a key signal generated from and controlled in a key matrix, a digitron displaying various functions of a VCR, and a timer control portion for generating a control signal driving an on-screen display which displays a character signal on a television screen and audio/video deck whenever the function of a VCR or a television is carried out and for generating control signals to drive the phase-locked loop, the digitron, and the on-screen display, the VCR of the present invention comprises program board means installed on the front plate of a VCR and formed with a track consisting of a signal detecting section and a plurality of sections which are related to the appointed time and date of a program, and sensor means for detecting the programmed time and date displayed on the program board means and providing program reserving data to the timer control portion.

According to the present invention, since the program board is detachably installed on the front plate of a VCR, a plurality of sections for days of the week and a plurality of sections for twenty four hours in the program board means are desirable to be formed in an X-Y matrix.

However, each twenty-four-hour section can be divided into fifteen-minute units or into thirty-minute units. Further, it is desirable that an actual-time track for displaying the start and end of an appointed program according to date is formed on the program board.

Also, a plurality of date sections are set up horizontally on the program board means having sections arranged in a matrix form, while a plurality of time sections are set up vertically. It is also possible that a plurality of time sections are set up vertically on the program board means, while a plurality of date sections are set up horizontally.

Therefore, the program board means provides an input signal for a program reserving function by having its sections erasably colored with an opaque mark according to an appointed date and time.

Meanwhile, a sensor means comprises a light emitting portion for generating a predetermined light to detect the time and date of the program displayed on the program board means, and a light receiving portion for providing a data signal for an appointed time and date of a program of a timer control portion according to the blocking or absorbing of the light generated in the light emitting portion by the sections of the time and date of the program board means, wherein the light receiving portion detects whether the light generated from the light emitting portion is blocked by the sections of the time and ate of the program board means which is placed inside the sensor means, thereby providing program reserving data to the timer control portion, or the light receiving portion detects whether the light generated from the light emitting portion is absorbed by the sections of the time and date of the program board means which is placed outside the sensor means, thereby providing program reserving data to the timer control portion.

Therefore, the sensor may comprise a plurality of light emitting diodes and plurality of photo transistors wherein a light emitting portion and a light receiving portion are divided and into which the program board means is inserted, or may be a plurality of sensors comprising united forms of light emitting diodes and phototransistors used for receiving light to detect the programmed data of the program board means and placed outside the sensor means.

BRIEF DESCRIPTION OF THE DRAWINGS

The novel features believed characteristic of the invention are set forth in the appended claims; the invention itself, however, as well as other features and advantages thereof, may best be understood by referring to the following detailed description of particular embodiments when read in reference to the accompanying drawings, wherein:

FIG. 4 is a flowchart to reserve a preprogrammed recording time according to the present invention.

DETAILED DESCRIPTION OF THE INVENTION

Figure 1:
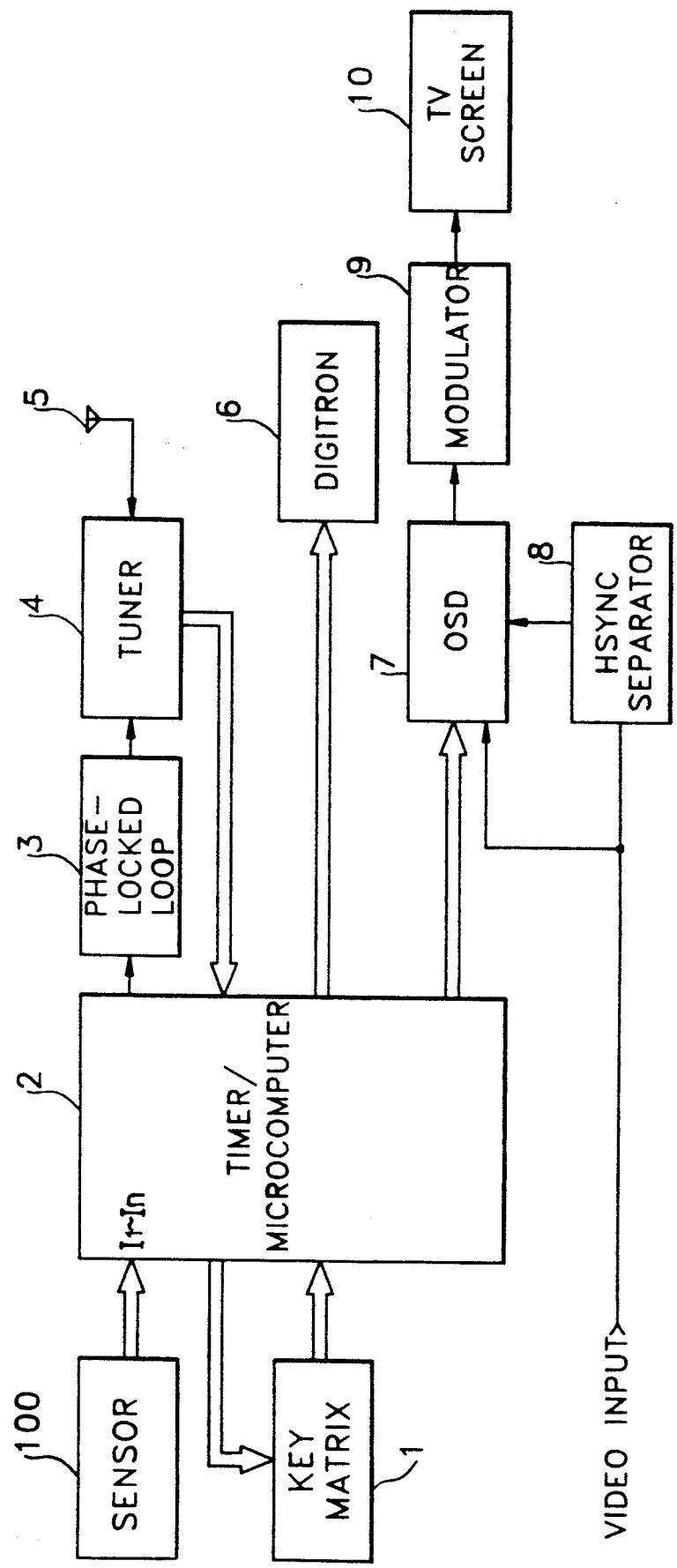
FIG. 1 is a schematic block diagram of a VCR having a program reserving function according to the present invention.

FIG. 1 is a schematic block diagram of a VCR having a programming function according to the present invention, wherein a key matrix 1 has a plurality of keys carrying out the ordinary function of a VCR such as VOL△, VOL▽, CH△, CH▽, PWR, PLAY, REC, FF, REW, SEARCH, PGM (program memory) and ENTER.

When a power key PWR in key matrix is pushed, power is supplied to a timer/microcomputer 2 and the circuits shown in FIG. 1 are enabled. If a channel selecting key in key matrix 1 is pushed, timer/microcomputer 2 controls a phase-locked loop 3 to generate a tuning voltage for a tuner 4, so that a broadcast channel signal received through an antenna 5 is tuned by the tuner 4 to be provided to timer/microcomputer 2.

Timer/microcomputer 2 also controls a digitron 6 to display a currently performed VCR or television function in character form, as well as an on-screen display (OSD) 7 which generates the corresponding characters. A horizontal synchronizing signal read from a VCR is separated in a horizontal synchronizing signal separator 8 and supplied to on-screen display 7 to be used for generating the character signal, and a RF modulator 9 modulates the video signal to display it on a television screen 10. The above functions are found in a typical VCR, however, the most essential element of the present invention, a sensor 100 is a novel aspect of the invention and is not found in a conventional VCR, as will be described later.

Figure 2:
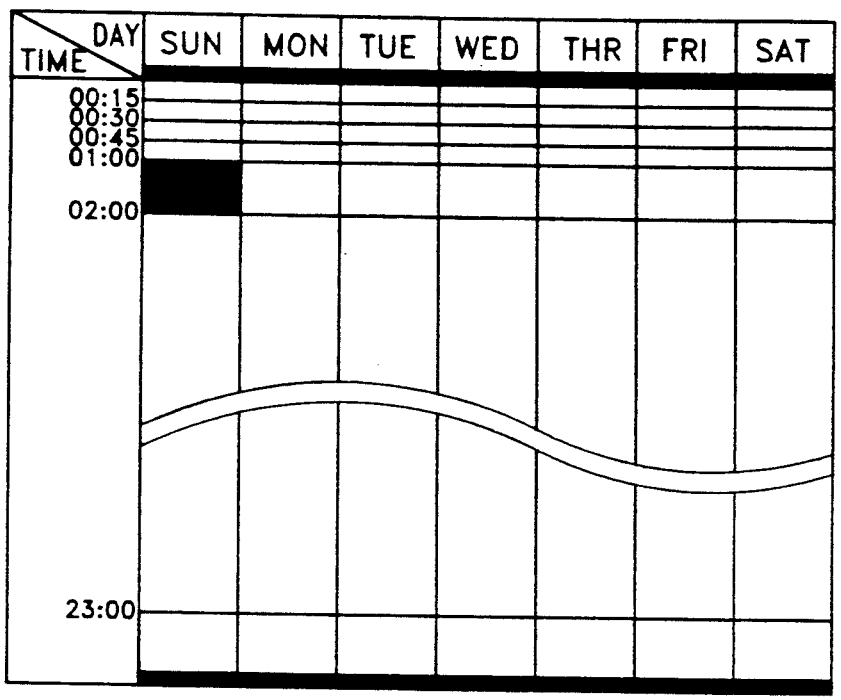
FIG. 2 is an exemplary illustration of a program board for scheduling a reserved program recording function according to the present invention.

In FIG. 2, according to the present invention, a program board 200 made of a transparent plastic reserves or programs a time and a day. Horizontal divisions of program board 200 represent days per week, while vertical divisions thereof represent hours per day. Each hour is further divided into four equal parts (fifteen-minute intervals) and such divisions are arbitrarily changeable. Therefore, program board 200 shown in FIG. 2 is subdivided into sections for days and those for hours, wherein a starting track 200A and an ending track 200B are opaque to calculate total hours by counting the actual time in programming.

Figure 3:
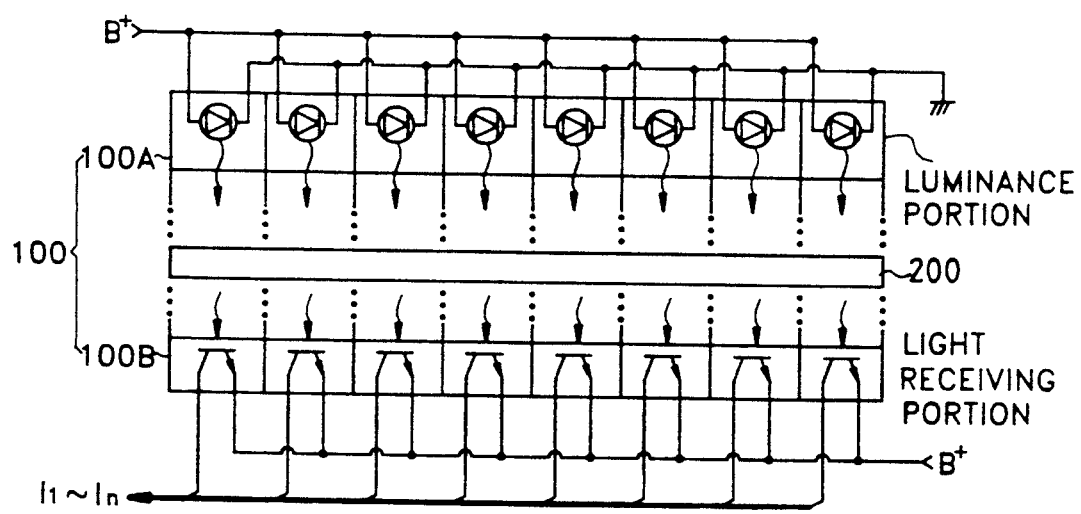
FIG. 3 schematically illustrates the construction of an embodiment of the sensor shown in FIG. 1.

When a programmed recording is for a program which runs from 1-2 A.M. on Sunday, a user colors in the section between 1 and 2 in the Sunday column with an opaque marker (for example, a White Board (Magic) Marker, a grease pencil, etc.), thereby setting up the appointed time of the program as seen in FIG. 3. Accordingly, the user can complete the recording of a reserved program at an appointed time by merely coloring in the section corresponding to the desired time of the week with a pen.

FIG. 3 illustrates sensor 100 detecting the colored section of the program board in order to set up the appointed time of a program, and providing the reserving time data to timer/microcomputer 2 of FIG. Sensor 100 comprises a photocoupler array installed on the front or side of a VCR or television, and generates reserved programming data from the opaque sections of program board 200.

Referring to FIG. 3, program board 200 comprises a light emitting portion 100A including a plurality of light emitting diodes and a light receiving portion 100B including a plurality of photo-transistors selectively receiving the light generated from light emitting portion 100A and providing data for setting the appointed time to timer/microcomputer 2. Here, the number of light emitting diodes of light emitting portion 100A corresponds, one to one, to the number of photo-transistors of light receiving portion 100B, and a great many of each are required for such a program board as shown in FIG. 2.

Accordingly, program board 200 is made of a transparent material, but light generated from a light emitting diode of light emitting portion 100A cannot penetrate an opaque portion, so that this light is not transmitted to a corresponding photo-transistor of light receiving portion 100B to the opaque portion. However, when a photo-transistor is turned on, that is, where light does penetrate, a corresponding input terminal I1-In of timer/microcomputer 2 connected to that transistor, receives a logic "high" signal, so that the microcomputer can detect the reservation of the appointed time. Thus, timer/microcomputer 2 counts the pulses generated by coloring a particular time field in black, and detects the program's length and starting and ending times.

FIG. 4 is a control flowchart for a program reserving method according to the present invention. When scheduling a program to be recorded, a user colors the space corresponding to the interval between the starting and ending times of a program and according to a day on program board 200 as shown in FIG. 2, inserts the program board between light emitting portion 100A and light receiving portion 100B of sensor 100 as shown in FIG. 3, and pushes a program memory key in key matrix 1 as shown in FIG. 1. At this time, timer/microcomputer 2 detects the input of a program memory key (step 300), recognizes that the current mode is a programming input mode (step 301), continuously checks until starting track 200A on programming board 200 is detected (step 302), and detects a pulse signal according to the time and day corresponding to the filled-in field selected by a user, which determines the day and time the recording is scheduled when a starting track 200A is sensed (step 303). Then, if a user pushes the input key in key matrix 1, timer/microcomputer 2 detects the input, advances the program from step 304 to step 305, and displays the input data on a television screen by means of on-screen display 7. Then, since the user selects a channel by a channel-selecting key in key matrix 1 using an on-screen display function, the appointed channel number and time are displayed on television screen 10, and the programming operation is terminated.

As described above, according to the present invention, anyone can easily execute a programmed recording function by coloring an appointed day and time on a program board using a black marker.

Having described this invention in relation to the embodiment shown in the accompanying drawings, it is our intention that the invention be not limited by any of the details of description, unless otherwise specified, but rather be construed broadly within its spirit and scope as set out in the accompanying claims. For example, the time sections of the program board as shown in FIG. 2 can be further subdivided or can be displayed using e different units, and the sensor in which light emitting and light receiving portions are jointly formed can be a reflective-type or an absorbing-type, to reflect or absorb light with the program board, instead of a light blocking-type in which light and emitting receiving portions are separated and the program board is inserted between them.

What is claimed is:

1. A video cassette recorder having a program reserving function, comprising a tuner for selecting a broadcasting channel according to the tuning voltage of a phase-locked loop driven by a key signal generated from and controlled in a key matrix, a digitron displaying various functions of a VCR, and a timer control portion for generating a control signal driving an on-screen display which displays a character signal on a television screen and audio/video unit whenever the function of a VCR or a television is carried out, and for generating control signals to drive said phase-locked loop, said digitron, and said on-screen display, said VCR further comprising:

program board means installed in the front plate of said VCR and formed with a track consisting of a signal detecting section and a plurality of sections which are related to the appointed time and date of a program;

sensor means for detecting the programmed time and date displayed on said program board means and providing program reserving data to said timer control portion; and wherein said sensor means comprises a light emitting portion for generating a predetermined light to detect the time and date of the program displayed on said program board means and a light receiving portion for providing a data signal for the appointed time and date of a program to said timer control portion according to a blocking or an absorption of the light generated in said light emitting portion by the sections of the time and date of the program board means.

2. A video cassette recorder as claimed in claim 1, wherein the light receiving portion detects that the light generated from said light emitting portion is blocked by the sections of time and date of said program board means which is placed inside of said sensor means, thereby providing program reserving data to said timer control portion.

3. A video cassette recorder as claimed in claim 1, wherein the light receiving portion detects that the light generated from the light emitting portion is absorbed by the sections of time and date of said program board means which is placed outside of said sensor means, thereby providing program reserving data to said timer control portion.

4. A video cassette recorder as claimed in claim 2, wherein said sensor comprises a plurality of light emitting diodes and a plurality of photo transistors, wherein said light emitting portion and said light receiving portion are divided to insert said program board means.

5. A video cassette recorder as claimed in claim 4, wherein said sensor means comprises a plurality of light emitting diodes and photo transistors integrally formed with each other to detect program data of said program board means placed outside of said sensor.

6. A video cassette recorder, having a program reserving function comprising a tuner for selecting a broadcasting channel according to the tuning voltage of a phase-locked loop driven by a key signal generated from and controlled in a key matrix, a digitron displaying various functions of a VCR, and a timer control portion for generating a control signal driving an on-screen display which displays a character signal on a television screen and audio/video deck whenever the function of a VCR or a television is carried out and for generating control signals to drive said phase-locked loop, said digitron, and said on-screen display, said VCR further comprising:

program board means installed in the front plate of said VCR and formed with a track consisting of a signal detecting section and a plurality of sections which are related to the appointed time and date of a program;

sensor means for detecting the programmed time and date displayed on said program board means and providing program reserving data to said timer control portion;

wherein said program board means has a plurality of sections for days of the week and a plurality of sections for twenty four hours formed in an X-Y matrix;

wherein said sections for twenty four hours are subdivided by fifteen-minute units or thirty-minute units; and wherein the sections of said program board means represent an opaque mark according to the appointed date and time of broadcast of a program and provide an input signal for a programming function.

* * * * *